United States Patent
Atwater

(10) Patent No.: US 8,104,300 B2
(45) Date of Patent: Jan. 31, 2012

(54) METHOD FOR ADJUSTING A NATURAL REFRIGERATION CYCLE RATE OF AN AIR CONDITIONER

(75) Inventor: Jonathan Trevor Atwater, Waterford, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 551 days.

(21) Appl. No.: 12/192,755

(22) Filed: Aug. 15, 2008

(65) Prior Publication Data
US 2010/0037640 A1 Feb. 18, 2010

(51) Int. Cl.
*G05D 23/32* (2006.01)
*F25B 1/00* (2006.01)

(52) U.S. Cl. .............. 62/158; 62/157; 62/226; 62/228.1

(58) Field of Classification Search .................... 62/157, 62/158, 156, 226, 227, 228.1, 231, 323.4; 236/46 R; 700/300
See application file for complete search history.

(56) References Cited

U.S. PATENT DOCUMENTS

| | | | |
|---|---|---|---|
| 5,065,593 A * | 11/1991 | Dudley et al. | 62/182 |
| 5,218,836 A | 6/1993 | Jarosch | |
| 5,335,514 A | 8/1994 | Hennessee et al. | |
| 5,507,154 A * | 4/1996 | Grant | 62/156 |
| 5,533,353 A | 7/1996 | Baker et al. | |
| 5,992,163 A | 11/1999 | Baruschke et al. | |
| 6,116,036 A | 9/2000 | Canavesi et al. | |
| 6,427,465 B1 | 8/2002 | Bednarchik et al. | |
| 2006/0266061 A1 * | 11/2006 | Wetekamp et al. | 62/228.1 |

* cited by examiner

*Primary Examiner* — Chen Wen Jiang
(74) *Attorney, Agent, or Firm* — Dierker & Associates, P.C.

(57) ABSTRACT

A method for adjusting a natural refrigeration cycle rate of an air conditioner includes monitoring a time between at least two sequential refrigeration "off" events or at least two sequential refrigeration "on" events, and determining whether the time is below or above a predetermined time. If the time is below the predetermined time, the method further includes increasing a refrigeration "on" temperature threshold. If, however, the time is above the predetermined time, the method further includes decreasing the refrigeration "on" temperature threshold.

19 Claims, 3 Drawing Sheets

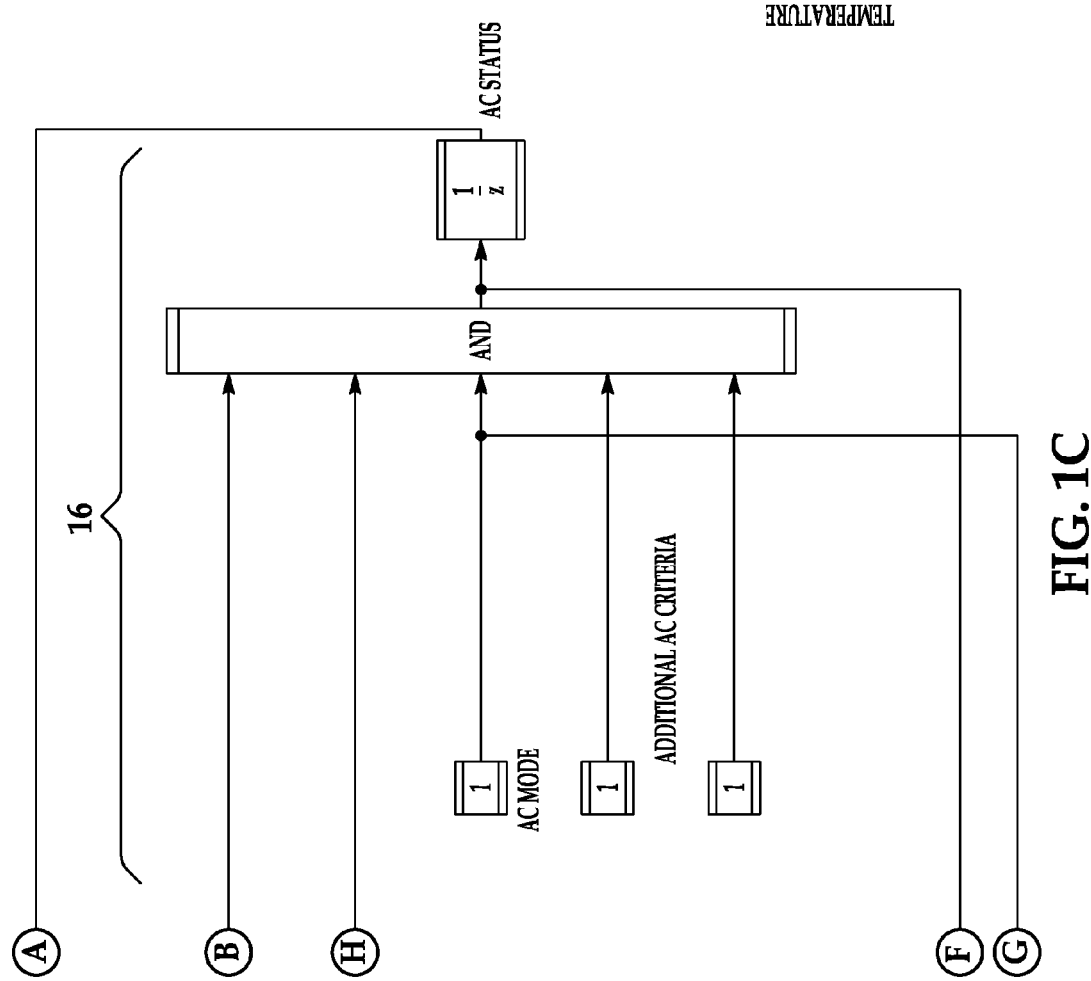

METHOD FOR ADJUSTING A NATURAL REFRIGERATION CYCLE RATE OF AN AIR CONDITIONER

BACKGROUND

The present disclosure relates generally to a method for adjusting a natural refrigeration cycle rate of an air conditioning system.

Vehicle air conditioning systems provide comfort to vehicle passengers. Such systems include at least a compressor, a condenser, and an evaporator. Air conditioning systems often include an expansion valve, and the expansion valve may be thermostatically controlled in some systems. Generally, a compressor compresses a refrigerant, which is subsequently passed through a condenser and an expansion valve. As the refrigerant expands to a lower pressure across the expansion valve, it becomes colder. The cold refrigerant is passed through a heat exchanger generally known as an evaporator which cools air passed over it. If the temperature of the evaporator is below the Dew Point, water from the air will condense on the surface of the evaporator, thus lowering the humidity of the air. Generally, the operating temperature of the evaporator is regulated in order to prevent the freezing of moisture that collects thereon. The refrigeration can be stopped and restarted to regulate the temperature of the evaporator.

The refrigeration can be stopped and started in many ways, for example by controlling the compressor, the Thermostatic Expansion Valve (TXV), or combinations thereof. The compressor is often driven by a mechanical component that may be cycled "on" and "off". For example, the mechanical component may be an electromagnetic clutch that can be used to releaseably couple the compressor to a pulley caused to rotate by a drive-belt connected to an engine. In another example, a variable displacement compressor may be configured to substantially stop compressing refrigerant. If there is a TXV, it may be cycled open and closed. The refrigeration cycle of the air conditioning system is managed, for example, using temperature or pressure relationships of the refrigeration circuit or of the evaporator in order to prevent the previously mentioned freezing conditions.

Temperature sensors may also be included to assist in managing the refrigeration cycles. Generally, temperature thresholds are used to regulate refrigeration cycles. For example if the temperature of air discharged from the evaporator exceeds an "on" threshold, the refrigeration cycle is activated by, for example, engaging the compressor or opening the TXV. If the temperature of air discharged from the evaporator falls below an "off" threshold, the refrigeration cycle is deactivated by, for example, disengaging the compressor or closing the TXV. In addition to or as an alternative to measuring the air temperature, the temperature of the fin and/or the refrigerant may be measured, and each of these measurements is indicative of the evaporator temperature.

The natural refrigeration cycle rate of an air conditioner is based on the rate at which the evaporator cools when cold refrigerant is supplied to it, and warms when the cold refrigerant supply is stopped.

SUMMARY

A method for adjusting a natural refrigeration cycle rate of an air conditioning system includes monitoring a time between at least two sequential refrigeration "off" events or at least two sequential refrigeration "on" events, and determining whether the time is below or above a predetermined time. If the time is below the predetermined time, the method further includes increasing a refrigeration "on" temperature threshold. If, however, the time is above the predetermined time, the method further includes decreasing the refrigeration "on" temperature threshold.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

FIGS. 1A, 1B and 1C together depict a schematic view of an embodiment of the system for adjusting the natural refrigeration cycle rate of an air-conditioning system; and FIG. 2 is a graph depicting evaporator discharge temperatures associated with the natural refrigeration cycle rate and the adjusted refrigeration cycle rate of an air conditioning system.

DETAILED DESRIPTION

Embodiments of the method disclosed herein enable the natural rate of a refrigeration cycle to be adjusted to match a desired rate of "on"/"off" cycling. The desired rate may be selected based on some outlet temperature variation criteria, or on some specific rate limit defined for durability. It is believed that the method disclosed herein advantageously presents an operating condition whereby sequential cycles do not exhibit a hi/low outlet temperature profile that causes large outlet temperature fluctuations. Rather, the method disclosed herein automatically adjusts the refrigeration cycle rate to reduce the variation of the outlet temperature and achieve a desirable temperature variation condition at the distribution outlets.

Figure 1A:
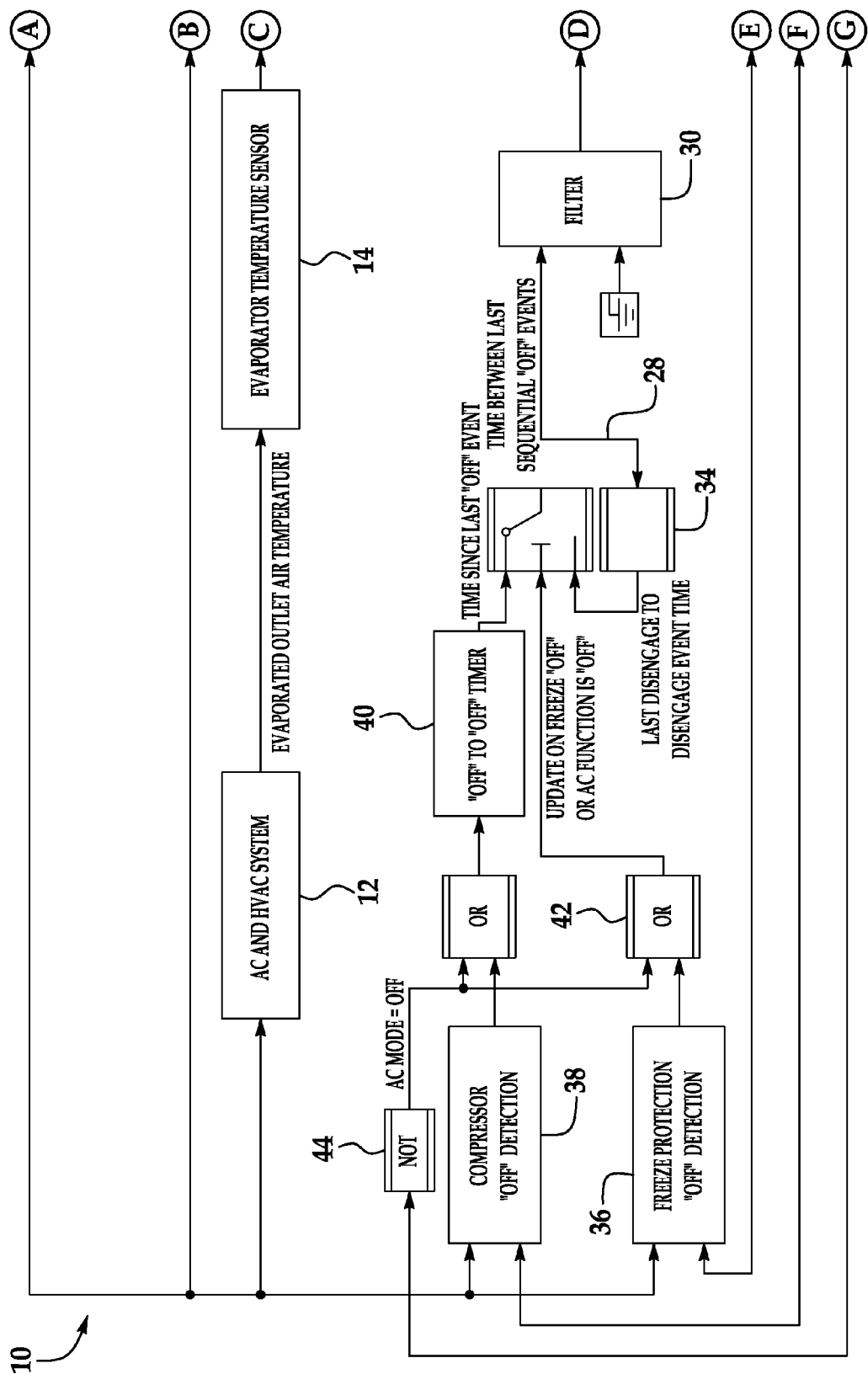
Figure 1B:
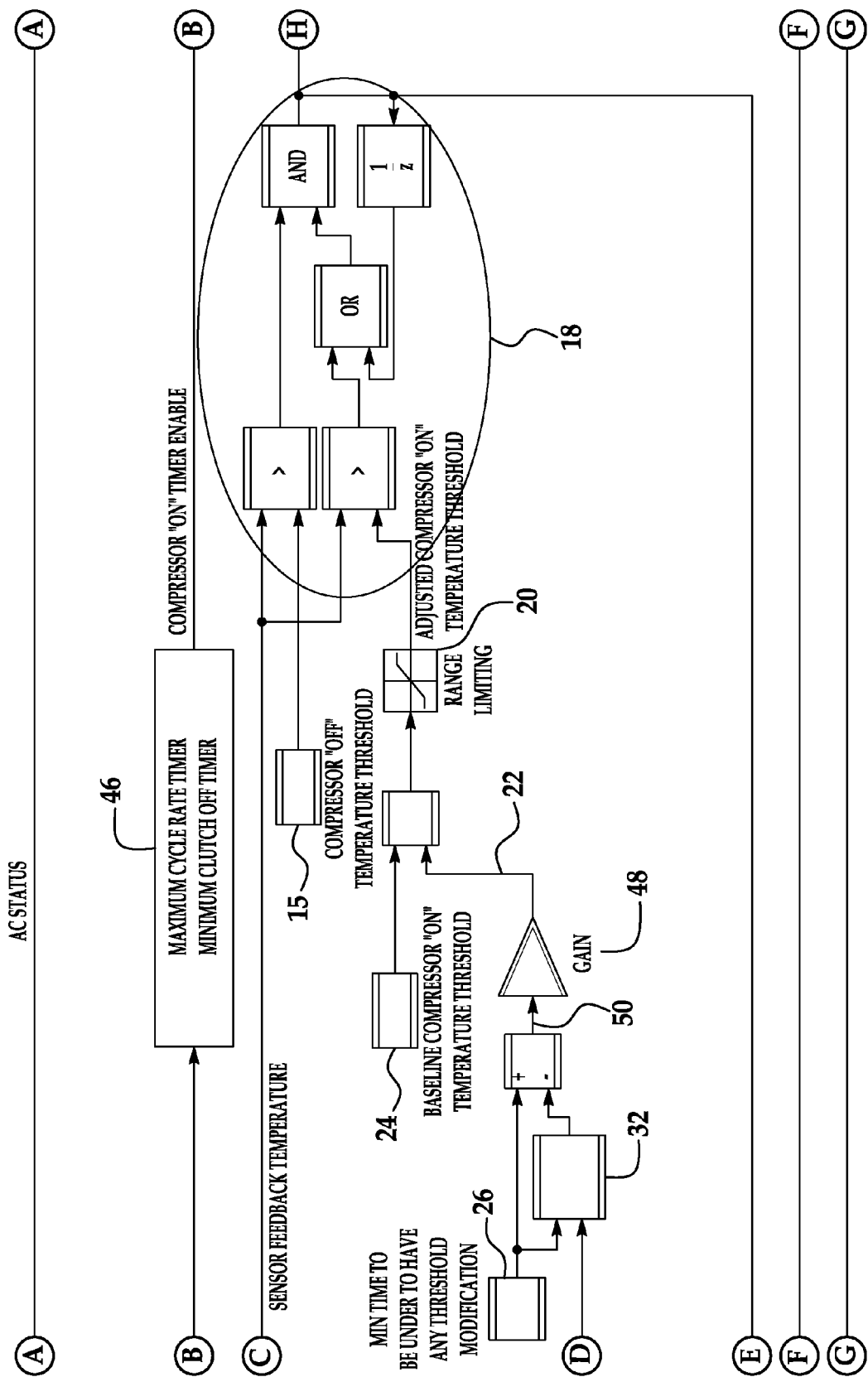

Referring now to FIGS. 1A, 1B and 1C together, an embodiment of the system 10 for adjusting the natural refrigeration cycle rate of an air conditioner (which is included in the AC/HVAC component 12) is depicted. It is to be understood that the method will be discussed in reference to these figures.

A sensor 14 is operatively connected to an evaporator (also included in the AC/HVAC component 12). When the compressor is turned "on", warm air blown through the evaporator to an outlet (not shown) is chilled. The sensor 14 is configured to detect a temperature of the chilled air (or of the fin and/or refrigerant, each of which is indicative of the air temperature) and to output a temperature sensor signal indicative of this temperature. An electronic control unit (ECU), included in the AC/HVAC component 12) is configured to receive the temperature sensor signal, and also to detect the time between sequential "on" or "off" events of the compressor. It is to be understood that generally the "off" events are directed by the compressor "off" temperature threshold, shown at reference numeral 15 in FIG. 1B.

In detecting the time, the ECU monitors the "on"/"off" state of the compressor. For example, the ECU is configured to record the time when the compressor state changes from "off" to "on" (an "on" event), and then again when the compressor states changes from "on" to "off" (an "off" event). The ECU is also configured to calculate and record the time between two or more sequential "on" events or two or more sequential "off" events". The ECU is programmed to compare the time between the "on" or "off" events with a predetermined time. As such, the system 10 also includes the software and hardware for making such a comparison. The predetermined time is generally any time that is desirable between "on" events or "off" events. It is to be understood that the compressor clutch is designed for a certain number of cycles over the life of the system 10. If the time between cycles is too short, then the clutch will reach the end of design life earlier than desirable. As such, the predetermined time is generally determined, at least in part, by the number of cycles that the particular compressor clutch is designed for.

It is to be understood that the hardware and software 18 determines whether the compressor should be "on" or "off" based upon the compressor "off" temperature threshold or the adjusted compressor "on" temperature threshold. The ECU is initialized with a predetermined compressor "on" temperature threshold. If the time measured between two or more sequential "on" or "off" events is more than a predetermined time, the ECU does not change the compressor "on" temperature threshold. If the time measured between two or more sequential "on" or "off" events is less than the predetermined time, the cycle is too fast and the compressor "on" temperature threshold is too low. In such instances, the ECU increases the compressor "on" temperature threshold to a desirable temperature. This increase in the compressor "on" temperature threshold will reduce the natural cycle rate of the compressor. If, however, the time measured between two or more sequential "on" or "off" events is above the predetermined time, the cycle is too slow and the compressor "on" temperature threshold is too high. In such instances, the compressor "on" temperature threshold is decreased to a desirable temperature. This decrease in the compressor "on" temperature threshold will increase the natural cycle rate of the compressor.

The increase or decrease in the natural cycle rate is believed to reduce the temperature variation of the evaporator during the air conditioning refrigerant compressor cycling. There will be less tendency for a durability cycle timer to override the natural cycle rate of the compressor and cause undesireable temperature variation. It is believed that by normalizing the temperature variation between sequential cycles, better regulation of the outlet temperature may be obtained and freeze protection of the system 10 may be optimized. FIG. 2 illustrates a non-limiting example of the reduced temperature variation (represented by the broken line) compared with the temperature variation (represented by the solid line) when the natural cycle rate is not adjusted using the method disclosed herein.

The compressor "on" temperature threshold may be adjusted after it is determined that the time between sequential "on" or "off" events is above or below the predetermined time. The comparison of the monitored time with the predetermined time may take place after two sequential "on" or "off" events have taken place, or after another desirable number of "on" or "off" events have taken place.

It is to be understood that while the cycle may be adjusted as often as desired, the temperature range for the compressor "on" temperature threshold may be limited by, for example, operation down to a specific temperature (such as may be necessary for defogging of the vehicle glass) and/or a desirable minimum threshold hysteresis to prevent signal noise induced nuisance cycling. As a non-limiting example, the minimum value of the compressor "on" temperature threshold may be slightly above the freeze temperature of the evaporator.

Reference numeral 20 in FIG. 1B illustrates a saturation function 20 that clips the adjusted compressor "on" temperature threshold to upper and lower limits. The output of saturation function 20 is the adjusted compressor "on" temperature threshold.

Increasing or decreasing the compressor "on" temperature threshold is accomplished by adding an offset/output (see reference numeral 22 (FIG. 1B)) to a baseline value (see reference numeral 24 (FIG. 1B)). It is to be understood that the range of the adjusted compressor "on" temperature threshold may be limited by a saturation function 20. The offset/output 22 is determined by calculating the difference between a minimum cycle time (reference numeral 26 (FIG. 1B)) and a time between sequential compressor "off" events (or "on" events) (reference numeral 28 (FIG. 1A)) after such time is subjected to low pass filtering (reference numeral 30 (FIG. 1A)). A tunable gain factor 48 is then applied to the calculated difference 50, and the offset/output 22 is generated. The tunable gain factor 48 is generally characteristic of the air conditioning system and the vehicle in which it is installed. If the gain is too high, the temperature will overshoot the desirable range and could lead to instability, and if the gain is too low, the response time of the system 10 will be slow. A slow response could lead to excessive compressor cycling, or excessive variation in temperature.

As mentioned hereinabove, the system 10 also includes a minimum cycle time 26, which constrains the method such that the adjusted compressor "on" temperature threshold does not lead to excessive cycle rates. Limit function 32 only allows positive threshold shifts which occur when the cycle time is less than the minimum cycle time. For example, if the minimum cycle time were 15 seconds, the maximum cycle rate would be 4 cycles per minute. In the example, limit function 32 would only allow increases in the "on" threshold temperature if the cycle time is less than 15 seconds.

As shown in FIG. 1A, the system 10 may also include a component 34 configured to maintain the last determined compressor "off" event to "off" event time (or "on" event to "on" event time). This time may be updated with each compressor cycle resulting from freeze protection (see reference numeral 36 (FIG. 1A)). A component 38 for recognizing every cycling of the compressor is also included. This component 38 is capable of restarting the "off" to "off" (or "on" to "on") timer 40, shown in FIG. 1A. Generally, the component 38 responds to the natural or adjusted compressor cycle. In some instances however, the AC function may be manually disabled by the user, and in these instances, the timer 40 is reinitialized to a time=0 by components 42 and 44 (FIG. 1A).

The system 10 may also include a cycle rate limiting timer 46, which ensures a minimum time between the sequential compressor "on" or "off" events. It is to be understood that such a timer 46 may be used to inhibit activation of the AC clutch until the time, temperature or other conditions are satisfied. As shown in FIG. 1C, the system 10 may also include a sub-system 16 which evaluates all of the inputs that affect the AC clutch control (e.g., user request, freeze control, ambient temperatures, or the like) in order to determine the actual clutch state. Such data may be used by the cycle rate limiting timer 46 (FIG. 1B), which may constrain or restrict the current state of the compressor according to the defined time limits applied in timer 46.

The system 10 may also use the sensed evaporator outlet air temperature to determine the state of the AC system. Such signals may be directly compared with the temperatures thresholds ("on" or "off"). It is to be understood that the temperature comparison may be accomplished in addition to the time comparison.

While several embodiments have been described in detail, it will be apparent to those skilled in the art that the disclosed embodiments may be modified. Therefore, the foregoing description is to be considered exemplary rather than limiting.

What is claimed is:

1. A method for adjusting a natural refrigeration cycle rate of an air conditioner, comprising:
monitoring a time between at least two sequential refrigeration "off" events or at least two sequential refrigeration "on" events;
determining whether the time is below or above a predetermined time; and
increasing a refrigeration "on" temperature threshold if the time is below the predetermined time, or decreasing the refrigeration "on" temperature threshold if the time is above the predetermined time; wherein increasing or decreasing is accomplished by:
determining an offset by:
calculating a difference between the at least two sequential refrigeration "off" events or the at least two sequential refrigeration "on" events and a minimum cycle time; and
applying a tunable gain factor; and
adding the determined offset to a baseline value.

2. The method as defined in claim 1 wherein the at least two sequential "off" events include two most recently occurring prior "off" events.

3. The method as defined in claim 1 wherein the at least two sequential "on" events include two most recently occurring prior "on" events.

4. The method as defined in claim 1 wherein increasing the refrigeration "on" temperature threshold decreases the natural refrigeration cycle rate.

5. The method as defined in claim 1 wherein decreasing the refrigeration "on" temperature threshold increases the natural refrigeration cycle rate.

6. The method as defined in claim 1 wherein the refrigeration "on" temperature threshold has a minimum value determined by an evaporator freeze temperature.

7. The method as defined in claim 1, further comprising reducing a temperature variation of an evaporator during air conditioning refrigeration cycling by increasing or decreasing the refrigeration "on" temperature threshold.

8. The method as defined in claim 7, further comprising:
receiving a signal indicative of a temperature of air exiting the evaporator during the time; and
comparing the temperature of the air exiting the evaporator with the refrigeration "on" temperature threshold.

9. The method as defined in claim 1, further comprising utilizing at least one cycle rate limiting timer to ensure a minimum time between the at least two sequential refrigeration "off" events or the at least two sequential refrigeration "on" events.

10. The method as defined in claim 1, further comprising low pass filtering the time between the at least two sequential refrigeration "off" events or the at least two sequential refrigeration "on" events.

11. The method as defined in claim 1, further comprising resetting an "off" to "off" timer when the refrigeration is manually deactivated, or when the refrigeration cycles off.

12. The method as defined in claim 1 wherein refrigeration "off" events are compressor "off" events, refrigeration "on" events are compressor "on" events.

13. A system for adjusting a natural refrigeration cycle rate of an air conditioning system, comprising:
a sensor for monitoring a time between at least two sequential refrigeration "off" events or at least two sequential refrigeration "on" events;
software for determining whether the time is below or above a predetermined time; and
a controller for increasing a refrigeration "on" temperature threshold if the time is below the predetermined time, or decreasing the refrigeration "on" temperature threshold if the time is above the predetermined time; wherein the controller is configured to:
determine an offset by:
calculating a difference between the at least two sequential refrigeration "off" events or the at least two sequential refrigeration "on" events and a minimum cycle time; and
applying a tunable gain factor; and
add the determined offset to a baseline value.

14. The system as defined in claim 13 wherein increasing the refrigeration "on" temperature threshold decreases the natural refrigeration cycle rate, or wherein decreasing the refrigeration "on" temperature threshold increases the natural refrigeration cycle rate.

15. The system as defined in claim 13 wherein the refrigeration "on" temperature threshold has a minimum value determined by an evaporator freeze temperature.

16. The system as defined in claim 13, further comprising:
an evaporator having an outlet for emitting air at a temperature, and a sensor configured to emit a signal indicative of the temperature during the time;
wherein the system is configured to receive the signal, and wherein the software is configured to compare the air temperature emitted by the evaporator with the refrigeration "on" temperature threshold.

17. The system as defined in claim 13, further comprising at least one refrigeration cycle rate limiting timer operatively connected to the air conditioning system to ensure a minimum time between the at least two sequential refrigeration "off" events or the at least two sequential refrigeration "on" events.

18. The system as defined in claim 13, further comprising at least one compressor wherein the refrigeration "on" event is a compressor "on" event, and the refrigeration "off" event is a compressor "off" event.

19. The system as defined in claim 13, further comprising at least one thermostatic expansion valve wherein the refrigeration "on" event includes a thermostatic expansion valve "open" event, and the refrigeration "off" event is a thermostatic expansion valve "closed" event.

* * * * *